Patented Feb. 18, 1947

2,416,068

UNITED STATES PATENT OFFICE 2,416,068

PREPARATION OF N-CYCLOALKENYL CARBAMATES

Carl E. Schweitzer, Wilmington, Del., assignor to E. I. du Pont de Nemours & Company, Wilmington, Del., a corporation of Delaware No Drawing. Application May 27, 1944, Serial No. 537,742

8 Claims. (Cl. 260—468)

This invention relates to the preparation of carbocyclic nitrogen compounds, and particularly to a novel method for preparing alkyl N-cycloalkenyl carbamates and related substances.

Heretofore ethyl N-cyclohexenyl carbamate has been prepared by reaction between the diethyl ketal of cyclohexanone and ethyl carbamate in the presence of an aniline hydrochloride catalyst (Hoch, Compt. Rend. 201, 560–2 (1935)). Pyrolysis of the resultant alkyl N-cyclohexenyl carbamate gave cyclohexenyl isocyanate, hence by heating the primary reaction product under suitable conditions, the unsaturated isocyanate could be obtained. This method for the preparation of alkyl N-cycloalkenyl carbamates and cycloalkenyl isocyanates had the disadvantage of requiring the intermediate preparation of cycloalkanone ketal, which was a relatively expensive and somewhat tedious operation. Because the alkyl-N-cycloalkenyl carbamates in the past were not readily available, they were of little or no interest from a commercial standpoint.

An object of this invention is to overcome the aforesaid disadvantages of the above-described method for preparing alky N-cyclohexenyl carbamates and cycloalkenyl isocyanates. Another object is to provide an economically feasible process for preparing these compounds. Other obpects of the invention will appear hereinafter.

The objects of the invention are accomplished by subjecting a carbocyclic ketone to reaction with an alkyl carbamate, whereby an alkyl N-cycloalkenyl carbamate is produced. It has been discovered that in the synthesis of alkyl N-cycloalkenyl carbamates it is unnecessary to employ the cycloaliphatic ketal as a reactant but that good results may be obtained simply by reacting the cycloaliphatic ketone with alkyl carbamate. The reaction is illustrated in the case of cyclohexanone by means of the following equation (R being an alkyl group)

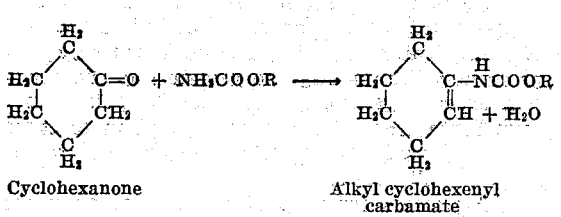

Cyclohexanone         Alkyl cyclohexenyl carbamate

The alkyl cycloalkenyl carbamates thus produced may be isolated by low pressure distillation of the reaction product. Distillation of the product at ordinary pressures results in the formation of cycloalkenyl isocyanate, which may be formed as indicated in the following equation:

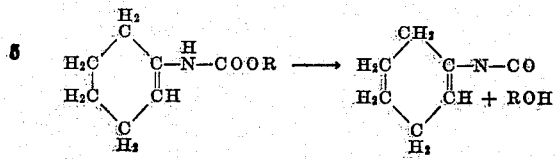

Alkyl N-cyclohexenyl carbamate         Cyclohexenyl isocyanate

In the synthesis of alkyl N-cycloalkenyl carbamates and cycloalkenyl isocyanates in accordance with this invention the cycloaliphatic ketone and alkyl carbamate are preferably heated together in the presence of an acid-reacting catalyst. In carrying out this synthesis it is generally desirable that the water produced by the reaction of the ketone and alkyl carbamate be withdrawn from the mixture while the reaction is in progress. A convenient procedure is to heat the reactants and the acidic catalyst in a distillation vessel, whereby the water produced by the reaction can be removed while the reaction is taking place.

The ketones which may be employed as reactants in accordance with the invention include cyclopentanone, cyclohexanone, methylcyclopentanones, methylcyclohexanones, cycloheptanone and the like. The alkyl carbamate reactants include the lower alkyl carbamates such as methyl carbamate, ethyl carbamate, isobutyl carbamate, amyl carbamate and the like, as well as the long chain alkyl carbamates, such as lauryl carbamate. The acid-reacting catalysts include mineral acids, such as hydrochloric acid, sulfuric acid, phosphoric acid and organic acid-reacting substance such as toluene sulfonic acid, pyridine hydrochloride, ethyl hydrogen sulfate, benzene sulfonic acid, aniline hydrochloride, and the like.

The reaction is generally conducted at a temperature within the range of 75° to 200° C., preferably about 100° to 125° C. The reaction pressure may be within the range of about 20 millimeters to 800 millimeters, absolute. Preferably the pressure is lowered as the reaction proceeds, so as to facilitate removal of water, and thereby drive the reaction towards completion. Thus the pressure may be about 760 millimeters at the start of the reaction, and may be progressively lowered over a period of several hours until a final pressure of about 20 millimeters is reached. In this manner water removal is accomplished by distillation without excessive vaporization and loss of the reactants. If it is desired to separate alkyl N-cycloalkenyl carbamate from the reaction mixture, the pressure should finally be lowered sufficiently to permit distillation of the alkyl N-cycloalkenyl carbamate at a temperature below 200° C.

The cyclic ketone and alkyl carbamate reactants may be present initially in about equimolar proportions, but it is generally preferred to employ a slight excess of the alkyl carbamate reactant. Satisfactory results are obtained when the molal proportion of alkyl carbamate to cyclic ketone is initially about 2 to 1. The amount of acid-reacting catalyst is generally about 1.0 to 5.0%, preferably about to 2.0%, of the total weight of the reactants.

The invention is further illustrated by means of the following examples, in which parts are by weight except as otherwise stated.

*Example 1.*—A mixture containing 49 parts of cyclohexanone, 89 parts of ethyl carbamate and 2 parts of aniline hydrochloride was heated in a still for 8 hours at a temperature of 115° C. During this time the pressure was gradually reduced from atmospheric pressure to 50 millimeters, and water was removed from the reaction mixture periodically by distillation. Finally, the pressure reduced to 21 millimeters, and a distillate containing ethyl N-cyclohexenyl carbamate was collected at a temperature of 145° C. (yield 46% based upon cyclohexanone).

*Example 2.*—A mixture containing 49 parts of cyclohexanone, 89 parts of ethyl carbamate and 2 parts of aniline hydrochloride was heated in a still for 8 hours at a temperature of 115° C. During this time the pressure was gradually reduced from atmospheric pressure to 50 millimeters, and water was removed from the reaction mixture periodically by distillation. The pressure was allowed to increase to 400 millimeters, and the temperature of the reaction mixture was raised to 200° C., whereby a distillate containing cyclohexenyl isocyanate was produced. Redistillation of the distillate gave pure cyclohexenyl isocyanate (B. P. 61° at 17 millimeters) in 40% yield based on the cyclohexanone initially charged.

The above examples are intended to be illustrative only, for it is evident that several different modifications of the invention will occur to those skilled in the art. Thus, various methods may be employed for removing water from the reaction mixture and thereby driving the reaction towards completion. If desired, water may be removed from the reaction mixture by the use of materials which form relatively low-boiling azeotropes with water.

The reaction between the cycloalkanone and the alkyl carbamate may be conducted either batchwise or continuously. Any suitable apparatus may be employed, such as a vacuum still in batchwise operation, or a falling film type converter in the continuous process.

The alkyl N-cycloalkenyl carbamates and the cycloalkenyl isocyanates which are prepared in accordance with this invention may be used for various purposes, such as reagents for the improvement of textiles, resin intermediates, oxidation inhibitors for lubricating oils, and reagents for introducing ethylenic linkages into resins containing hydroxyl groups.

It will be understood that many different embodiments of this invention may be made without departing from the spirit and scope thereof and that we do not limit ourselves except as set forth in the following claims.

I claim:

1. In a process for preparing alkyl carbocyclic nitrogen compounds, the steps which comprise subjecting a carbocyclic ketone of the class consisting of cyclopentanone, cyclohexanone, methylcyclopentanones, methylcyclohexanones and cycloheptanone to reaction with an alkyl carbamate and withdrawing water from the reaction mixture while the reaction is in progress whereby an alkyl N-cycloalkenyl carbamate is formed.

2. In a process for preparing alkyl carbocyclic nitrogen compounds, the steps which comprise subjecting a carbocyclic ketone of the class consisting of cyclopentanone, cyclohexanone, methylcyclopentanones, methylcyclohexanones and cycloheptanone to reaction with an alkyl carbamate in the presence of an acid-reacting catalyst and withdrawing water from the reaction mixture while the reaction is in progress whereby an alkyl N-cycloalkenyl carbamate is formed.

3. In a process for preparing alkyl carbocyclic nitrogen compounds, the steps which comprise subjecting a carbocyclic ketone of the class consisting of cyclopentanone, cyclohexanone, methylcyclopentanones, methylcyclohexanones and cycloheptanone to reaction with an alkyl carbamate in the presence of an acid-reacting catalyst at a temperature within the range of 75° to 200° C., and withdrawing water from the reaction mixture while the reaction is in progress whereby an alkyl N-cycloalkenyl carbamate is formed.

4. A process for preparing alkyl N-cycloalkenyl carbamates which comprises subjecting a carbocyclic ketone of the class consisting of cyclopentanone, cyclohexanone, methylcyclopentanones, methylcyclohexanones and cycloheptanone to reaction with an alkyl carbamate in the presence of an acid-reacting catalyst, withdrawing water from the reaction mixture while the reaction is in progress, and distilling alkyl N-cycloalkenyl carbamate from the resultant reaction mixture at a temperature below 200° C. and a pressure below 400 millimeters.

5. A process for preparing alkyl N-cycloalkenyl carbamates which comprises subjecting a carbocyclic ketone of the class consisting of cyclopentanone, cyclohexanone, methylcyclopentanones, methylcyclohexanones and cycloheptanone to reaction with an alkyl carbamate in the presence of an acid-reacting catalyst at a temperature within the range of 75° to 200° C., distilling water from the reaction mixture by progressively diminishing the pressure as the reaction proceeds and distilling alkyl N-cycloalkenyl carbamate from the resultant reaction mixture at a temperature below 200° C. and a pressure below 400 millimeters.

6. A process for preparing alkyl cyclohexenyl carbamates which comprises subjecting cyclohexanone to reaction with an alkyl carbamate in the presence of an acid reacting catalyst at a temperature within the range of 75° to 200° C., distilling water from the reaction mixture by progressively diminishing the pressure as the reaction proceeds, and distilling alkyl N-cycloalkenyl carbamate from the resultant reaction mixture at a temperature below 200° C. and a pressure below 400 millimeters.

7. A process for preparing alkyl cyclohexenyl carbamates which comprises subjecting cyclohexanone to reaction with an alkyl carbamate in the presence of an acid reacting catalyst at a temperature within the range of about 100° to 125° C., and at a progressively diminished pressure within the range of 20 millimeters to 800 millimeters, removing water from the reacting mixture by distillation and thereafter distilling the resultant alkyl N-cyclohexenyl carbamate from the reaction mixture at a temperature below 200° C. and a pressure below 400 millimeters.

8. A process for preparing ethyl N-cyclohexenyl carbamate which comprises subjecting cyclohexanone to reaction with ethyl carbamate in the presence of an acid reacting catalyst at a temperature within the range of about 100° to 125° C., at a progressively diminished pressure within the range of 50 millimeters to atmospheric pressure, removing water from the reaction mixture by distillation, and distilling ethyl N-cyclohexenyl carbamate from the resultant mixture at a temperature below 200° C. and a pressure below 400 millimeters.

CARL E. SCHWEITZER.

REFERENCES CITED

The following references are of record in the file of this patent:

FOREIGN PATENTS

| Number | Country | Date |
| --- | --- | --- |
| 485,761 | British | May 24, 1938 |

OTHER REFERENCES

Strain "Jour. of the American Chemical Society," vol. 52, p. 820 to 823 (1930).

Bischoff, "Berichte," volume 7 (1874), page 634.